(12) United States Patent
Mott

(10) Patent No.: X7864
(45) Date of Patent: Dec. 16, 1833

(54) BATH, MEDICATED SHAMPOO

(76) Inventor: Richard D. Mott

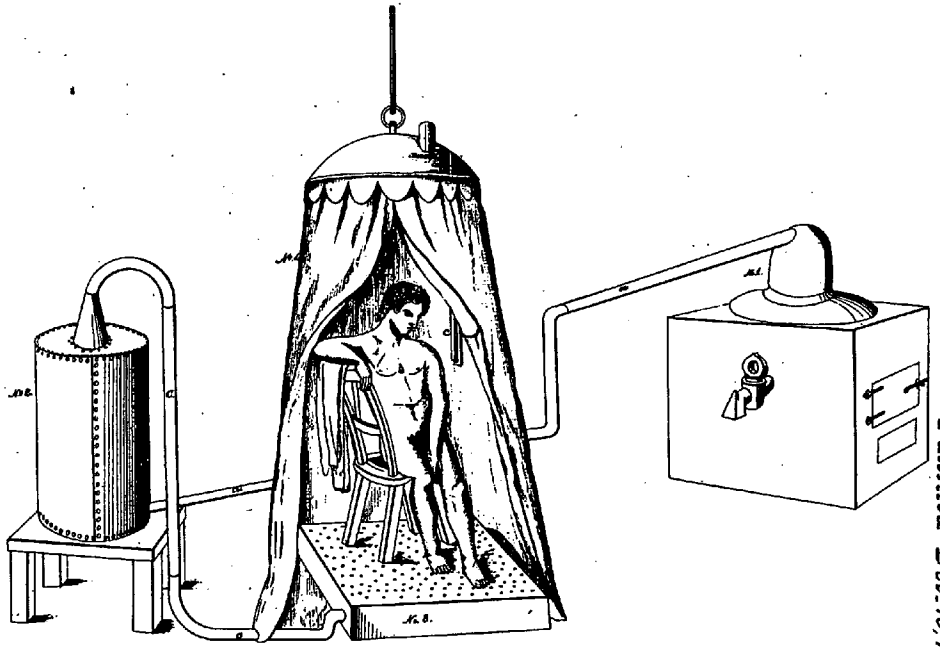

United States Patent
Patent No.: X7864
X7864
R. D. Mott
Vapor Bath,
Patented Dec. 16, 1833.